Aug. 9, 1938.  E. MOORE  2,126,270
TWO-CYCLE SOLID FUEL INJECTION SUPERCHARGED ENGINE
Filed Oct. 28, 1937  5 Sheets-Sheet 1

INVENTOR
Edward Moore
BY
A. D. T. Libby
ATTORNEY

Aug. 9, 1938.  E. MOORE  2,126,270
TWO-CYCLE SOLID FUEL INJECTION SUPERCHARGED ENGINE
Filed Oct. 28, 1937  5 Sheets-Sheet 3

INVENTOR
Edward Moore
BY
A. D. T. Libby
ATTORNEY

Aug. 9, 1938.  E. MOORE  2,126,270
TWO-CYCLE SOLID FUEL INJECTION SUPERCHARGED ENGINE
Filed Oct. 28, 1937  5 Sheets-Sheet 4
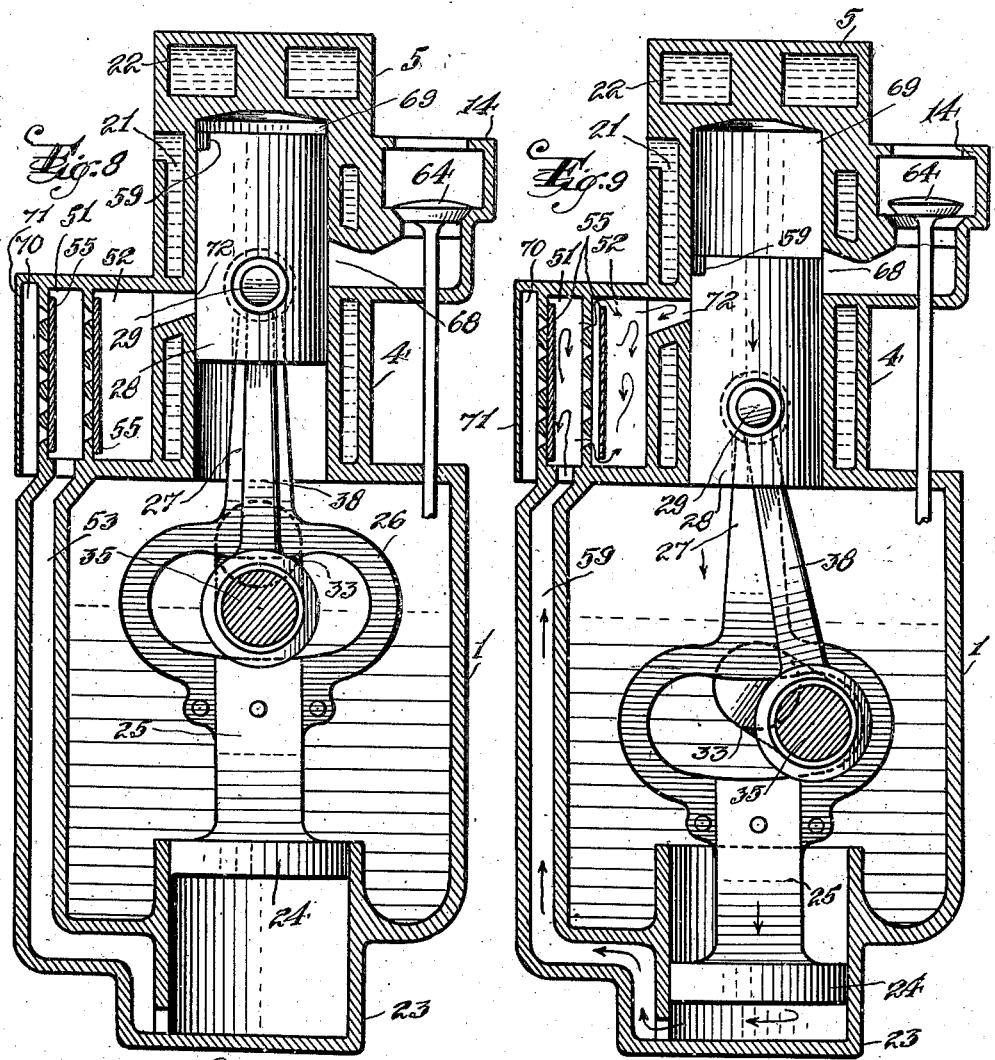
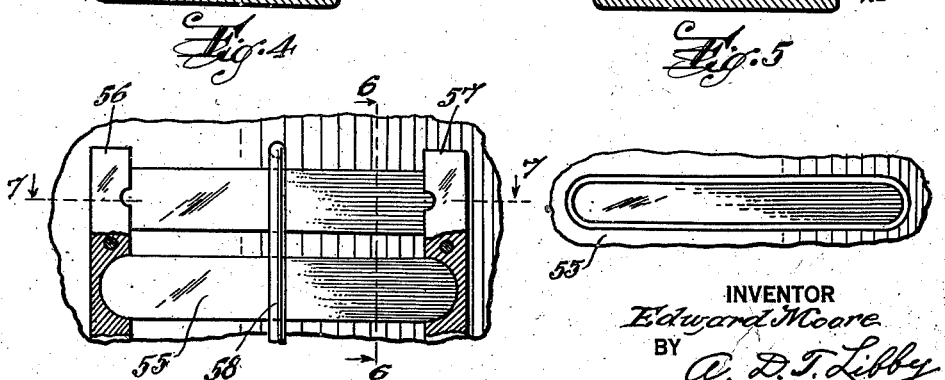
INVENTOR
Edward Moore
BY
A. D. T. Libby
ATTORNEY

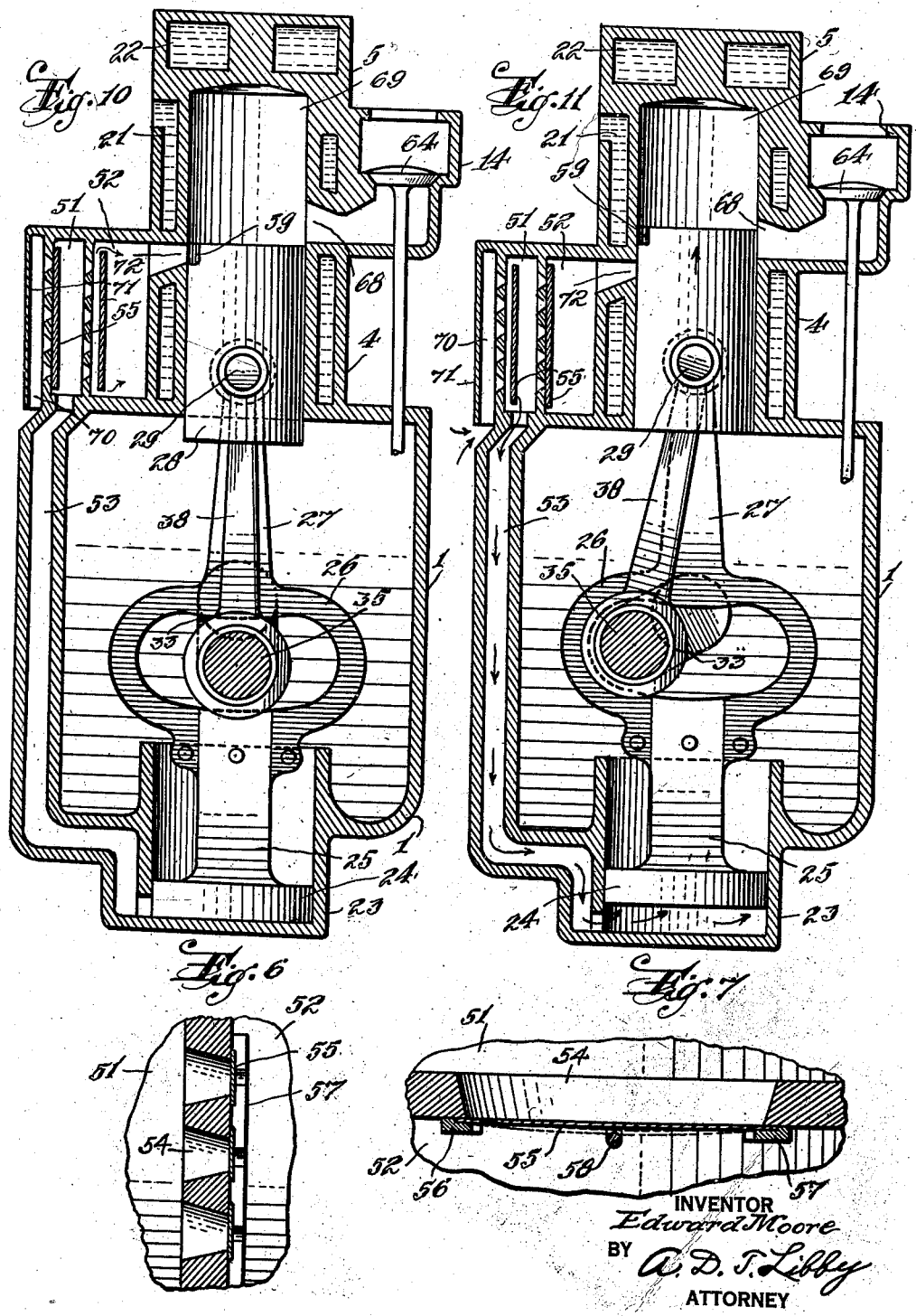

Patented Aug. 9, 1938

2,126,270

UNITED STATES PATENT OFFICE 2,126,270

TWO-CYCLE SOLID-FUEL INJECTION SUPERCHARGED ENGINE

Edward Moore, Newark, N. J., assignor of one-half to David Peterson, Newark, N. J.

Application October 28, 1937, Serial No. 171,411

17 Claims. (Cl. 123—56)

This invention relates to a solid-fuel-injection, two-cycle, supercharged engine of the Diesel type.

In the ordinary four-cycle type of Diesel engine, the engine horsepower is proportional to the size of the cylinder and it is therefore limited to the amount of air which can be taken into the cylinder, and as this air is taken in by a suction stroke, the amount of air is measured by the cubical contents of the cylinder, and likewise, the power developed by the engine.

It is the principal object of my invention to greatly increase the horsepower, per pound of weight, of the engine, and hence greatly reduce the horsepower weight and cost of such an engine.

Another object of my invention is to provide a unit construction which may be readily combined into a small and compact type of multi-cylinder engine.

These and other objects will be apparent to one skilled in this particular art, from a reading of the specification taken in connection with the annexed drawings, wherein:

Figure 4 is a part-elevational and part-sectional view on the line 4—4 of Figure 2.

Figure 5 is a view of the back side of Figure 4, looking at one of the air openings.

Figure 6 is a view on the line 6—6 of Figure 4.

Figure 7 is a view on the line 7—7 of Figure 4.

Figure 1:
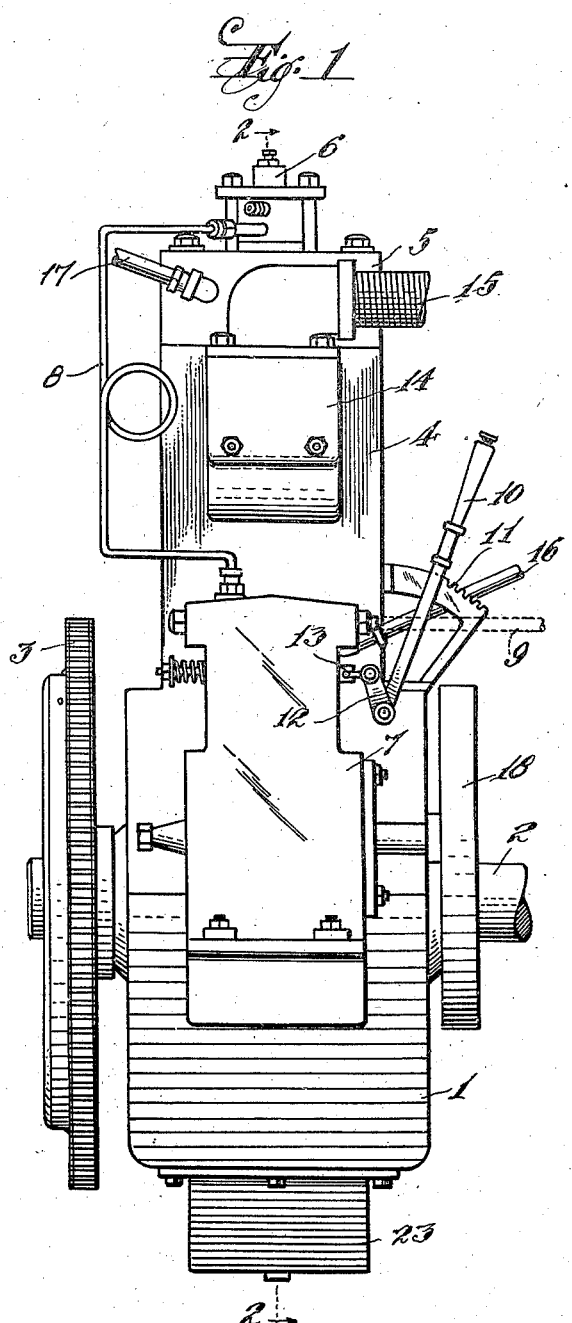
Figure 1 is a side elevation of a single-cylinder engine of my improved design.

Figures 8 to 11 inclusive are skeleton views showing diagrammatically the operating sequence of the working parts of the engine.

Referring now to the details wherein like numbers refer to corresponding parts in the various views, 1 is a crank case of the engine which supports the crank shaft 2, one end of which carries a flywheel 3 which preferably has teeth cut therein for the purpose of applying an electric starter thereto. Projecting upwardly from the crank case 1 is a cylinder 4, having a removable head 5 which carries a fuel injection nozzle 6. A fuel pump 7 is attached to one side of the crank case and has a fuel feed pipe 8 leading to the injection nozzle 6. The pump is driven in any satisfactory manner from the crank shaft through a chain of gearing within the housing 18, and, as indicated, two gears 19 and 20, shown in Figure 2, are utilized for driving the pump at crank shaft speed.

Fuel is fed to the pump 7 by a feed pipe 9, which is shown in dotted lines in Figure 1 so as not to hide the speed control lever 10 which is equipped with a ratchet tooth to engage teeth on a sector 11. The control lever 10 is connected through a link 12 to a member 13 which controls the fuel flow from the pump 7 to the pipe 8. On one side of the cylinder is attached an exhaust chamber 14 having an exhaust pipe 15 leading therefrom. Water-cooling pipes 16 and 17 act to carry cooling water to the cylinder cooling chamber 21 and cylinder head cooling chamber 22.

Fastened to the bottom of the crank case is an air-compression cylinder 23, within which is adapted to function a piston 24 having the usual piston rings. The piston 24 is connected to the main engine piston 28 through the medium of a compound piston rod made up of the section 25 joined to a yoke 26 from which projects the upper part 27 of the piston rod which is connected to the piston 28 by a pin 29. It should be noted here that the stroke of both the pistons 24 and 28 is exactly the same by being connected together by a rigid piston rod, but since the diameter of the cylinder 23 is larger than the bore 69 of the cylinder 4, the amount of air forced from the cylinder 23 through the pipe or passageway 53 into the chambers 51 and 52, is much greater than the cubical contents of the bore 69.

Figure 2:
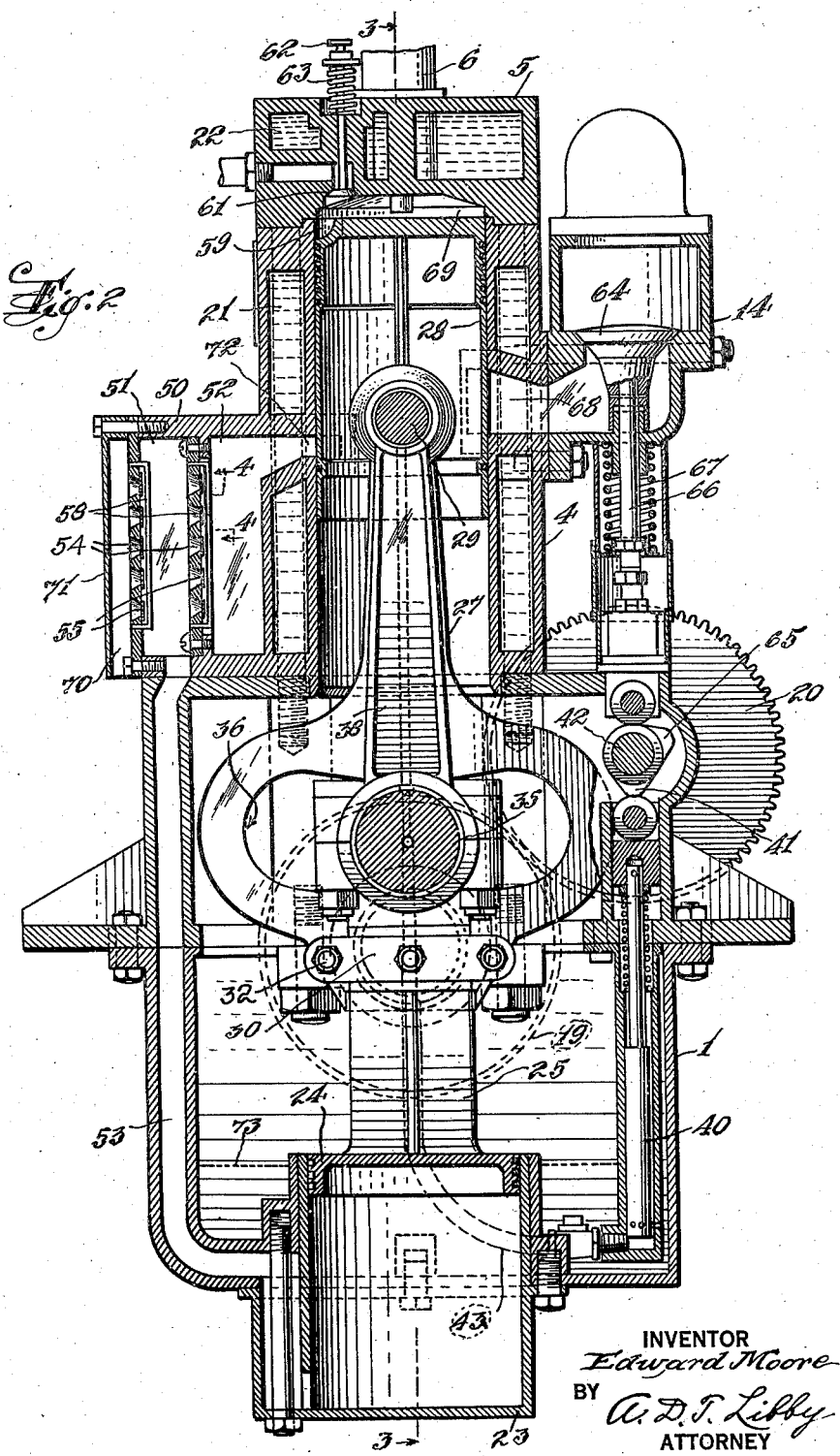
Figure 2 is a vertical, sectional view on the line 2—2 of Figure 1, but with the fuel feed pump omitted.
Figure 3:
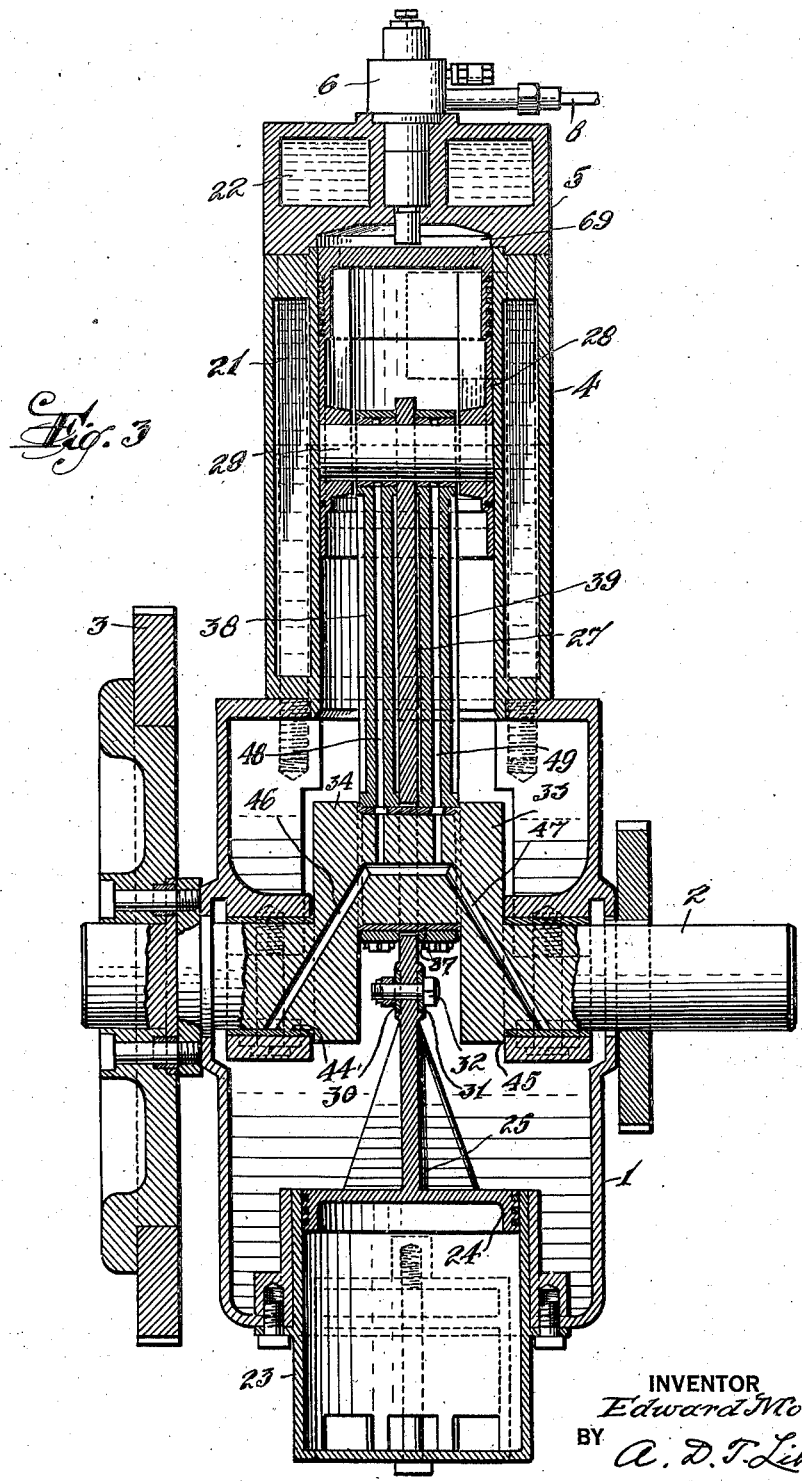
Figure 3 is a vertical, sectional view on the line 3—3 of Figure 2.

For the purpose of assembly, the lower portion of the piston rod 25 is detachably fastened to the yoke 26 as shown in Figures 2 and 3, by a pair of strap plates 30 and 31 which are bolted together and to the yoke 26, and rod 25 by a plurality of bolts 32. The crank shaft 2 has a pair of crank arms 33 and 34 having an integral crank pin 35 extending therebetween. As shown in Figure 2, the crank pin 35 is adapted to travel within the boundary line 36 defining an opening in the yoke 26. In other words, the crank pin 35 travels within the space bounded by the line 36, but without contacting with the surface thereof.

Positioned on the crank pin 35 through a suitable bearing member 37, and spaced on opposite sides of the piston rod 27, are a pair of connecting rods 38 and 39 which, through suitable bearings, engage the piston pin 29. To oil the bearing 37 and the bearings of the connecting rods 38 and 39 on the piston pin 29, an oil feed pump 40 is provided which is operated by a cam 41 positioned on the shaft 42 carrying the gear wheel 20. As the pump 40 is operated, oil is forced through the feed pipe line 43 into suitable oil chambers in the main bearings 44 and 45, from which the oil is forced by passageways 46 and 47, 48 and 49, into the bearings on the pin 29, the passageway 48 being within the connecting rod 38 and the passageway 49 being within the connecting rod 39. The oil level in the crank case is indicated by the dotted line 73.

Fastened to the back side of the engine, not shown in Figure 1 but shown in Figure 2, is an initial compression chamber 50 having two sections, 51 being the air intake portion or section and 52 being the supercharging section. The section or chamber 51 is connected to the air compression cylinder 23 by a rectangular-shaped passageway 53 which is cast integral with the base parts of the engine. The passageway is sufficiently large in cross-sectional area so as to rapidly pass the air therethrough.

The air intake section or chamber 51 is provided with a plurality of openings 54 which are controlled by thin valve members 55 which are held in place, as shown more particularly in Figures 4 to 7 inclusive. The plates 55 are preferably of tempered steel and have their ends located under keeper bars 56 and 57 in such a way that the ends of the valve members 55 are slightly loose under the bars 56 and 57 so that they may be flexed during the operation of the engine which will be later described. In order that the valve members may not be flexed sufficiently so as to pull them out from under the keepers 56 and 57, a stop member in the form of a rod 58 is utilized, which passes across in front of all of the valve members 55 and is fastened to the casing in any satisfactory manner. The valves which separate the chamber 51 from the chamber 52 are the same as those already described, both sets of valves being mounted on removable plates as indicated.

The piston 28 is provided with a notched-out deflector portion 59 to cooperate with an opening 72 in the side of the cylinder leading into the chamber 52. As shown in Figure 2, the head of the engine 5 is provided with a relief valve 61 which is actuated by any suitable, manually operated device engaging the end 62 of the valve stem, the valve being held in closed position by a spring 63.

Positioned within the exhaust chamber 14 is a valve 64 which is actuated by a cam 65 carried by the shaft 42 through the medium of a valve stem 66 which is normally held in closed position by a spring 67. The operation of the valve 64 in connection with the exhaust port 68 will be described later in connection with the operation of the engine. The injection valve 6 need not be described as it is a standard type now on the market and forms no part of my present invention.

Coming now to the operation of the engine, and referring particularly to diagrammatic Figures 8 to 11 inclusive, Figure 8 shows the main piston and air-compression piston and associated parts in the same position as indicated in Figure 2.

Let it be assumed that in Figure 8 the fuel has been injected into the cylinder and burning has taken place, and the pistons 28 and 24 are just starting on their downward stroke. Under this condition, air, which has been drawn in through the space 70 back of the guard plate 71 and through the openings 54 associated with the valves 55, and through the passageway 53, is now beginning to be compressed, which will close the valves 55, sealing off the chamber portion 51 from the atmosphere. As soon as the piston 24 moves downwardly a certain distance, the pressure built up in the cylinder 23 will then force open the valves 55 leading into the chamber 52, thereby creating in this chamber a definite predetermined pressure of about eight pounds, which I have found by many experiments to be best suited for this purpose when the main cylinder compression is at approximately four hundred pounds.

As the piston 28 continues on its downward travel, the exhaust valve 64 is fully opened by the time the piston starts to open the port 68. This is of material advantage in greatly increasing the life of the valve, because the valve is wide open when the hot gases from the cylinder reach the port around the valve. In the ordinary gasoline four-cycle engine, when the exhaust valve starts to open, the exhaust gases are at their hottest value and hence tend to burn up or pit the seat of the valve, so that the method of operation of the valve 64 in my engine is of material benefit. The continued movement of the piston 28 downward opens up the port 68 and the exhaust gases will pass out through the exhaust chamber 14.

It will be noted that in diagrammatic Figures 8 to 11 inclusive, the valves 55 are indicated as a single piece. This is merely for the sake of clarity.

As the piston 28 continues its downward travel, it finally opens the intake port 72 and the air in the chamber 52, which is under eight-pound compression, begins to flow into the main cylinder bore 69 and starts scavenging the exhaust gases through the exhaust chamber. However, before the piston 28 reaches the full limit of its down stroke, as indicated in Figure 10, the valve 64 has closed and the supercharging air in the chamber 52 moves into the cylinder 69 and continues to flow until the piston 28 starts on its upward movement and closes the port 72, and while the port 68 is not then closed, this supercharging air cannot escape through the exhaust chamber because the valve 64 is on its seat, so that the net result is that the cylinder 69 is filled with air having a volume which, taken at atmospheric pressure, would be at least one-third greater than the air which would be retained in the cylinder under the normal operation of the cylinder if there were no supercharging means, which means that with my present invention I get at least one-third more air into the cylinder as would otherwise be possible with a four-cycle engine with the same bore and stroke.

Continued upward movement of the piston as shown in Figure 11, closes the port 72 and the suction stroke begins in the cylinder 23 by the upward movement of the piston 24. Under this condition, since there is still some pressure in the chamber 52, the valve 55 sealing this off from the chamber 51 is closed and the valve 55 leading from the chamber 51 out to the air space 70 will be open. In addition, the suction on the valve in the chamber 52 will also assist in holding the valve closed. Further upward movement of the piston 28 in Figure 11 brings the parts back to firing position shown in Figure 8, or the beginning of the power stroke.

In an engine which I have constructed and operated according to the drawings of this application, I have used the following proportions between the main power cylinder and the air compression cylinder:

The main cylinder having a bore of 4″ with a 5″ stroke, while the air compression cylinder is 5½″ in diameter with a 5″ stroke, giving a displacement ratio of approximately 1.8, thereby giving what I have found to be an excellent supercharging effect for the bore and stroke of the main piston as above described.

The arrangement of the air compression cylinder 23 as described does not take up any more space than the oil sump in the ordinary gasoline engine, and by reason of the supercharging effect which I attain, the size of the engine is no bigger than an engine having the same bore and stroke of the four-cycle gasoline type, and it will thus be seen that I have obtained a two-cycle, solid-fuel injection type of Diesel engine which is of small and compact size and which can be built into multi-cylinder engines requiring no greater chassis space than the ordinary gasoline engine of the same horsepower.

From the construction described, it should be understood that in starting the engine, a full cycle of movement of the piston 24 will completely charge the air chamber 52 to the normal operating pressure, so that the power cylinder will be supercharged in one revolution of the engine, thereby making the engine exceedingly easy to start which I believe to be a new and important feature in this type of engine.

It will be understood that the details of construction may be varied without departing from the spirit of my invention or the scope of the appended claims.

What I claim is:

1. In an engine of the class described having a main crank case carrying a crank shaft, a power cylinder having a solid-fluid injection valve therein, with means for passing fuel through the valve at the proper time, and an air compressing cylinder positioned in alignment with the power cylinder on the opposite side of said crank case, a piston for each of said cylinders rigidly connected, one to the other, by a single piston rod, connecting rod means joining the power piston to said crank shaft, an air chamber carried by the power cylinder which has a port leading into said chamber opened and closed by the power piston, said air chamber being connected by a passageway to said air compressing cylinder and provided with valve means to control the flow of compressed air from said air cylinder into the chamber by way of said passageway, an exhaust chamber carried by said power cylinder which has a port leading into said exhaust chamber, and a valve for opening and closing an exit from said exhaust chamber at the proper time in the firing cycle substantially as described.

2. An engine as defined in claim 1, further characterized in that the air compression cylinder has a volume nearly twice that of the power cylinder and is capable of setting up a pressure in the air chamber of approximately eight pounds prior to the opening of the port therefrom into the power cylinder.

3. An engine as defined in claim 1, further characterized in that the air compression cylinder has a volume materially in excess of the volume of the power cylinder whereby an excess volume of air is compressed in the air chamber and injected into the power cylinder when the power piston opens the air port from the cylinder to the air chamber.

4. An engine as defined in claim 1, further characterized in that the air compression cylinder has a volume materially in excess of the volume of the power cylinder whereby an excess volume of air is compressed in the air chamber and injected into the power cylinder when the power piston opens the air port from the cylinder to the air chamber, the valve controlling the exit from the exhaust chamber being closed a sufficient length of time before the power piston reaches the end of its expansion stroke to insure the trapping in the power cylinder of a supercharge of air.

5. An engine as defined in claim 1, further characterized in that the air compression cylinder has a volume such that it can transmit under pressure, through said air chamber into the power cylinder, sufficient air which if expanded to atmospheric pressure would be materially in excess of the volume of the power cylinder.

6. An engine as defined in claim 1, further characterized in that said connecting rod means comprises two rods disposed one on each side of the piston rod.

7. An engine as defined in claim 1, further characterized in that said connecting rod means comprises two rods disposed one on each side of the piston rod, said piston rod having a loop within the boundary of which the crankshaft pin travels.

8. An engine as defined in claim 1, further characterized in that said connecting rod means comprises two rods disposed one on each side of the piston rod, said piston rod having a loop within the boundary of which the crank shaft pin travels, that portion of the piston rod which connects with the air compressing piston being for assembly purposes, disconnectable from the loop portion of the piston rod.

9. A two-cycle, super-charged engine of the fuel injection type having means for injecting fuel therein at the proper time, comprising a power cylinder and an air compressing cylinder arranged in tandem and having pistons connected by a rigid piston rod, a crank shaft having a crank arm or pin connected to the piston in the power cylinder, an exhaust chamber having an exit and an air chamber carried by the engine, the latter chamber having a passageway to said air compressing cylinder, said power cylinder having an air port leading into said air chamber and also having an exhaust port leading into said exhaust chamber, both said ports being opened and closed by the power piston, valve means in the air chamber for trapping air therein under pressure from said compression cylinder through said passageway, and a valve positioned in the exit from the exhaust chamber for insuring that air under pressure is trapped in the power cylinder while the said ports are still open.

10. An engine as defined in claim 9, further characterized in that said crank arm or pin is connected to the power piston by a pair of connecting rods located, one on each side of said rigid piston rod.

11. An engine as defined in claim 9, further characterized in that said crank arm or pin is connected to the power piston by a pair of connecting rods located, one on each side of said rigid piston rod, said piston rod having a loop within the boundary of which the crank shaft pin travels.

12. An engine as defined in claim 9, further characterized in that said crank arm or pin is connected to the power piston by a pair of connecting rods located, one on each side of said rigid piston rod, said piston rod having a loop within the boundary of which the crank shaft pin travels, that portion of the piston rod which connects with the air compressing piston being, for assembly purposes, disconnectable from the loop portion of the piston rod.

13. An engine as defined in claim 9, further characterized in that said air chamber is divided into two parts connected by valve means responsive to air pressure, the outer part having valve means for connecting it to free air, said passageway opening into this said outer part.

14. An engine as defined in claim 9, further characterized in that said air chamber is divided into two parts connected by valve means responsive to air pressure, the outer part having valve means for connecting it to free air, said passageway opening into this said outer part, said valve means for both said parts comprising a plurality of thin flexible strips covering ports and adapted to flex by action of air against them, and means for limiting the amount which said strips may be flexed.

15. In a two-cycle fuel injection engine, means for air-super-charging the engine power cylinder prior to the fuel injection, said means including as a part of the engine an air compressing cylinder having a piston connected to operate with the power piston to compress air, an air chamber to receive and hold air under pressure from said compressing cylinder, an exhaust chamber having an exit and a valve for opening and closing said exit, while the power piston is uncovering and holding open a port into said exhaust chamber, as well as a port into said air chamber said valve being substantially fully opened before the power piston uncovers the exhaust port, and closes before the piston reaches the full limit of its power stroke whereby air under pressure from the air chamber is passed to and trapped in the power cylinder, ready for the compression stroke of the engine.

16. An engine as set forth in claim 15, further characterized in that the power cylinder and air compressing cylinder are oppositely disposed and their pistons are connected by a rigid piston rod whose axis is a substantially straight one, the air compressing cylinder having a diameter substantially larger than the diameter of the power piston, while the air chamber is proportioned so that a pressure of approximately eight pounds of air is available when the port into the power cylinder is opened by the power piston.

17. A unit for a multi-cylinder engine of the type described comprising a power cylinder and an air compressing cylinder arranged in tandem relationship, both cylinders having inter-connected pistons, an exhaust chamber and an air chamber attached to said cylinder which has ports leading into said chambers, valve means in said air chamber for trapping air under pressure coming from said compressing cylinder, the said cylinders and air chamber being proportioned so that about eight pounds of pressure are obtained in the air chamber prior to the opening of the power cylinder port into the air chamber, when the power cylinder pressure for ignition is approximately four hundred pounds and a valve associated with said exhaust chamber and timed for trapping air in the power cylinder as it comes from said air chamber on uncovering of said ports by the power piston whereby a surplus quantity of air can be positively secured in the power cylinder.

EDWARD MOORE.